(12) United States Patent
Ho

(10) Patent No.: US 9,430,882 B2
(45) Date of Patent: Aug. 30, 2016

(54) COMPUTERIZED VEHICLE MAINTENANCE MANAGEMENT SYSTEM WITH EMBEDDED STOCHASTIC MODELLING

(71) Applicant: Kenton Ho, Mississauga (CA)

(72) Inventor: Kenton Ho, Mississauga (CA)

( * ) Notice: Subject to any disclaimer, the term of this patent is extended or adjusted under 35 U.S.C. 154(b) by 0 days.

(21) Appl. No.: 14/051,834

(22) Filed: Oct. 11, 2013

(65) Prior Publication Data

US 2015/0105968 A1 Apr. 16, 2015

(51) Int. Cl.
| | | |
|---|---|---|
| G01M 17/00 | (2006.01) | |
| G07C 5/00 | (2006.01) | |
| G06Q 10/00 | (2012.01) | |

(52) U.S. Cl.
CPC ............... *G07C 5/006* (2013.01); *G06Q 10/20* (2013.01); *G07C 5/008* (2013.01)

(58) Field of Classification Search
USPC .............................. 701/29.1, 29.4, 31.4, 31.5
See application file for complete search history.

(56) References Cited

U.S. PATENT DOCUMENTS

| | | | |
|---|---|---|---|
| 4,943,919 A | 7/1990 | Aslin et al. | |
| 5,764,509 A | 6/1998 | Gross et al. | |
| 6,301,531 B1 | 10/2001 | Pierro et al. | |
| 6,434,512 B1 | 8/2002 | Discenzo | |
| 6,553,290 B1 | 4/2003 | Pillar | |
| 6,859,739 B2 | 2/2005 | Wegerich et al. | |
| 7,065,433 B2 | 6/2006 | Basu et al. | |
| 7,095,748 B2* | 8/2006 | Vij et al. ....................... 370/401 | |
| 7,096,074 B2 | 8/2006 | Yulevitch et al. | |
| 7,230,527 B2 | 6/2007 | Basu et al. | |
| 7,233,886 B2 | 6/2007 | Wegerich et al. | |
| 7,308,385 B2 | 12/2007 | Wegerich et al. | |
| 7,373,283 B2 | 5/2008 | Herzog et al. | |
| 7,539,597 B2 | 5/2009 | Wegerich et al. | |
| 7,630,802 B2 | 12/2009 | Breed | |
| 7,636,648 B2 | 12/2009 | Johansson et al. | |
| 7,640,145 B2 | 12/2009 | Wegerich et al. | |
| 7,689,394 B2 | 3/2010 | Furem et al. | |
| 7,882,394 B2 | 2/2011 | Hosek et al. | |
| 7,945,427 B2 | 5/2011 | Guenther et al. | |
| 8,095,261 B2 | 1/2012 | Howell et al. | |
| 8,165,826 B2 | 4/2012 | Schimert et al. | |
| 8,346,429 B2 | 1/2013 | Nwadiogbu et al. | |
| 8,356,207 B2 | 1/2013 | Hosek et al. | |
| 8,396,622 B2 | 3/2013 | Underdal et al. | |
| 8,423,226 B2 | 4/2013 | Underdal et al. | |
| 8,429,467 B2 | 4/2013 | Fallen et al. | |
| 8,442,702 B2 | 5/2013 | Geiter | |
| 2001/0033225 A1 | 10/2001 | Razavi et al. | |
| 2002/0184178 A1 | 12/2002 | Tasooji et al. | |
| 2003/0139908 A1 | 7/2003 | Wegerich et al. | |
| 2003/0191564 A1 | 10/2003 | Haugse et al. | |
| 2004/0039646 A1* | 2/2004 | Hacker ........................... | 705/22 |
| 2004/0059618 A1* | 3/2004 | Ford et al. ........................ | 705/8 |
| 2004/0078171 A1 | 4/2004 | Wegerich et al. | |
| 2004/0158367 A1 | 8/2004 | Basu et al. | |
| 2004/0243636 A1 | 12/2004 | Hasiewicz et al. | |

(Continued)

*Primary Examiner* — Hussein A. Elchanti
(74) *Attorney, Agent, or Firm* — George P Kolber

(57) ABSTRACT

A computerized maintenance management system for vehicles comprises a data warehouse, comprising a communications link for receiving data relating to vehicle maintenance, a storage component for storing received data, and a modeling component comprising modeling algorithms stored within the data warehouse. The modeling component is thus able to process the data in real-time within the data warehouse, and outputs a predictive model with recommended maintenance and/or replacement schedules that is always based on the most current available data.

10 Claims, 3 Drawing Sheets

(56) References Cited

U.S. PATENT DOCUMENTS

| | | |
|---|---|---|
| 2005/0096873 A1 | 5/2005 | Klein |
| 2006/0229777 A1 | 10/2006 | Hudson et al. |
| 2006/0271248 A1* | 11/2006 | Cosgrove et al. .............. 701/2 |
| 2007/0198215 A1 | 8/2007 | Bonanni et al. |
| 2007/0250229 A1 | 10/2007 | Wu |
| 2008/0042875 A1* | 2/2008 | Harrington et al. ..... 340/870.19 |
| 2009/0216393 A1 | 8/2009 | Schimert |
| 2009/0254240 A1* | 10/2009 | Olsen et al. .................... 701/30 |
| 2010/0042287 A1 | 2/2010 | Zhang et al. |
| 2010/0262431 A1 | 10/2010 | Gilbert |
| 2010/0332073 A1* | 12/2010 | Mathieson et al. ............. 701/32 |
| 2012/0099478 A1* | 4/2012 | Fu et al. ...................... 370/254 |
| 2012/0316832 A1 | 12/2012 | Pire |
| 2013/0079972 A1 | 3/2013 | Lake et al. |
| 2013/0117739 A1* | 5/2013 | Mueller et al. ................ 717/169 |
| 2013/0297352 A1* | 11/2013 | Noe et al. ........................ 705/4 |

\* cited by examiner

COMPUTERIZED VEHICLE MAINTENANCE MANAGEMENT SYSTEM WITH EMBEDDED STOCHASTIC MODELLING

FIELD OF THE INVENTION

This invention relates to computerized vehicle maintenance management systems.

BACKGROUND OF THE INVENTION

Computerized maintenance management systems for vehicles such as cars and trucks are used to gather data relating to a specific fleet of vehicles and predict faults and failures in vehicle components utilizing well known predictive modeling algorithms. Diagnostic data through vehicle on-board telematics computers and diagnostics data collected through hardware readers located at a repair or maintenance facilities and/or other sources, combined with vehicle repair data captured by a technician at a technician console or via manual data entry at the repair shop, can be correlated to determine component aging, status, faults and failures. This combination of data sets are used to provide predictions regarding failure rates and failure timing of vehicle components, which can significantly reduce costs and improve safety by allowing for more focused preventative maintenance of the vehicles, thereby avoiding the high cost and environmental impact of vehicle breakdown in the heavy duty industry.

Examples of such systems are found in U.S. Pat. Nos. 4,943,919, 5,764,509, 6,301,531, 6,434,512, 6,553,290, 6,859,739, 7,065,433, 7,096,074, 7,230,527, 7,233,886, 7,308,385, 7,373,283, 7,539,597, 7,630,802, 7,636,648, 7,640,145, 7,689,394, 7,882,394, 7,945,427, 8,095,261, 8,165,826, 8,346,429, 8,356,207, 8,396,622, 8,423,226, 8,429,467 and 8,442,702; all of which are incorporated herein by reference in their entireties; and published US patent application nos. 20010033225, 20020184178, 20030139908, 20030191564, 20040078171, 20040158367, 20040243636, 20050096873, 20060229777, 20070198215, 20070250229, 20090216393, 20100042287, 20100262431, 20120316832 and 20130079972; all of which are incorporated herein by reference in their entireties.

However, in these prior art systems the data is stored in a data repository or 'warehouse', and must be extracted from the data warehouse and fed into the modeling software for processing, as shown in FIG. 1. In a typical implementation the data is communicated from the fleet maintenance facility to the data warehouse (via a communications link if necessary), then a fleet manager must extract data from a CMMS, in a compatible format, and import that CMMS data into stochastic software in order to create a predictive model. Since this is a resource-intensive and lengthy process, it is not uncommon that by the time the CMMS data is extracted from the CMMS and imported to the stochastic software, the relevant data set in the CMMS itself has already changed due to the capture of new repair data. This means that the data is never 'fresh' when it is processed by the modeling software, and commensurately, predictive models created under this methodology will always be "stale". Working with aged data can have a material adverse effect on the accuracy of fault and failure predictions.

Also, the population of vehicles from which data can be extracted for modeling is often limited to a particular repair or maintenance facility, which limits the precision that can be obtained from the modeling algorithms. Currently, there is no way for one fleet to compare its modeled data with that of another fleet in order to determine whether, on a relative basis, they are cost-optimized in managing unexpected failures. Due to the complexity of extracting CMMS data and importing that data into stochastic software, most fleets cannot even produce predictive cost optimization models, let alone share their modeled data with other fleets in order to determine peer performance.

Particularly in some industries, such as the heavy truck industry where trucks are often designed for specific purposes, it can be difficult to temporarily replace a vehicle that has experienced an unexpected fault or failure. When passenger vehicles unexpectedly fail, replacement vehicles can usually be found due to the ubiquity of national rental fleets. When heavy-duty vehicles unexpectedly fail, it is often extremely difficult to find like-duty replacements. In addition to lost revenue, and potentially delivery penalties and lost driver hours (due to non-revenue generating activities), an unexpected failure can also result in additional costs for transporting maintenance crews, equipment, overnight hotel stays and an overall increase in $CO_2$ emissions.

Accordingly, the accuracy and currency of fault and failure predictions is much more than a convenience. It can be the difference between a safe, reliable vehicle and costly (and in extreme cases hazardous) consequences.

BRIEF DESCRIPTION OF THE DRAWINGS

In drawings which illustrate by way of example only a preferred embodiment of the invention.

DETAILED DESCRIPTION OF THE INVENTION

The present invention provides a system that combines repair and maintenance failure data with real-time telematics sensor data in a way that allows machine learning and stochastic predictive models to be applied to data collected from groups of like vehicles across different fleets, for the purpose of optimizing fleet maintenance costs by providing a prediction as to when it would be most cost effective to perform preventive replacement work, or to decide to allow the component to run to failure.

Figure 1:
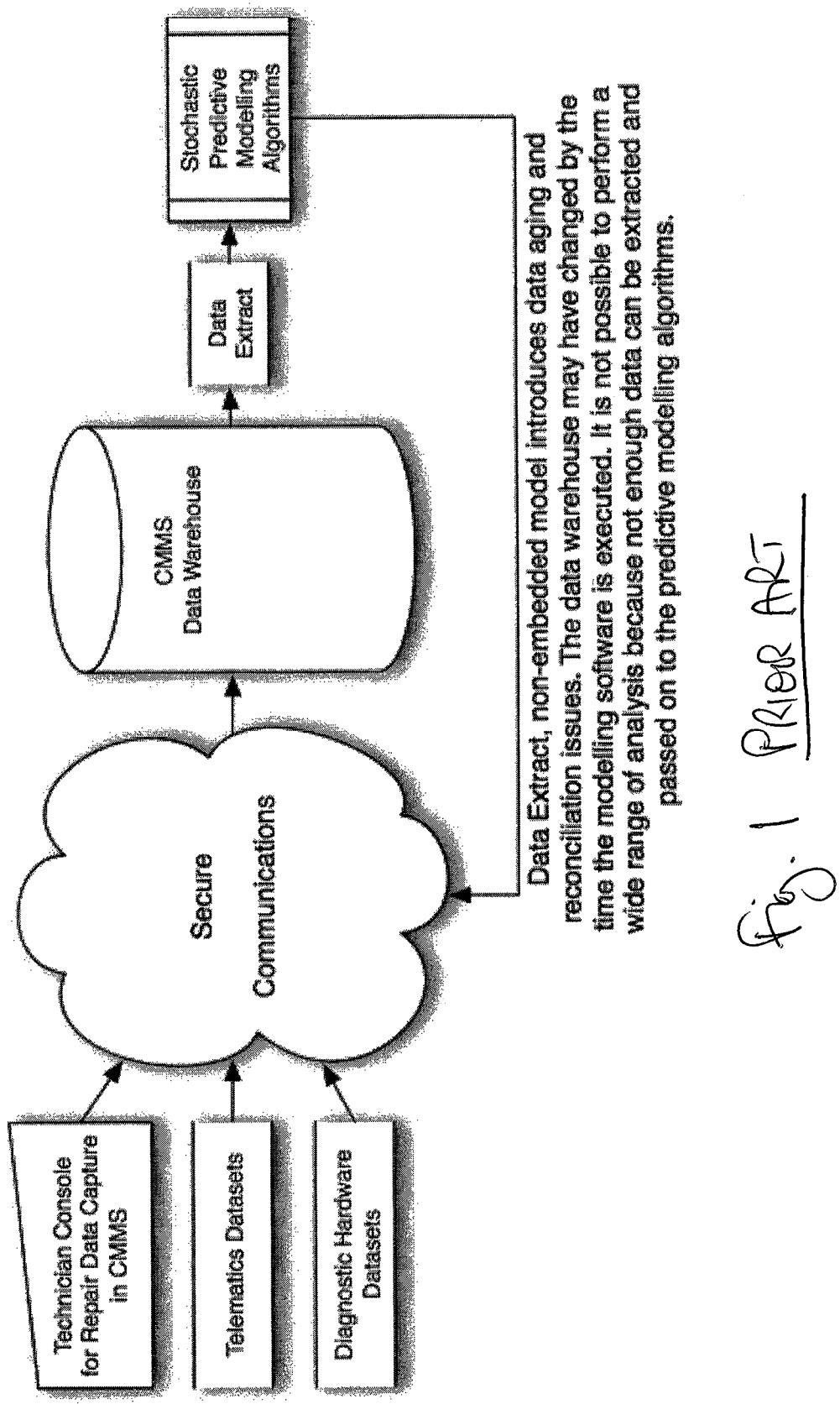
FIG. 1 is a schematic diagram of a prior art computerized maintenance management system (CMMS).
Figure 2:
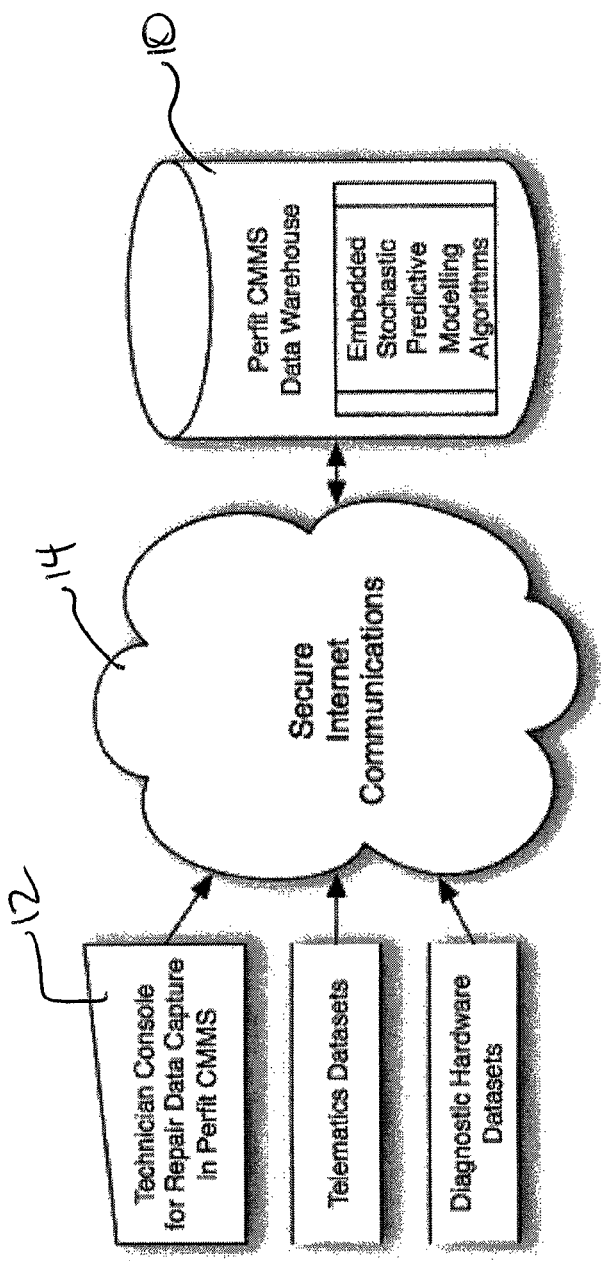
FIG. 2 is a schematic overview of a computerized maintenance management system according to the invention.

The system of the invention captures real-life repair data, and processes it through stochastic modeling in real-time to generate the failure predictions. This is accomplished by embedding stochastic predictive modeling software within the data warehouse 10 itself, as illustrated in FIG. 2. In contrast to prior art systems, in which once the data is extracted and analyzed more data has already been captured which invalidates the original model, the system of the invention obviates the need for continuous reconciliation because the both data and the modeling algorithms are embedded in the same platform. Modeling is thus based on the source data, rather than an outdated copy of the source data.

Data relating to vehicle faults and failures may be supplied in a number of ways. In the heavy truck industry, most newer vehicles are equipped with telematics transmitters that periodically transmit data wirelessly to a telematics administrator, which in turn feeds the data directly to the system of the invention via a secure communications link 14. This data includes vehicle diagnostics data, and in some cases provides fault codes that can be correlated against historical reliability data. This data source uses automated data feeds from vehicle on-board computers to provide real time conditions which can be correlated against past failure data captured by a technician during a repair event to generate a prediction on the probability of the next failure. This is an application of Condition Based Maintenance.

Data may also be obtained from a reader manually attached to the vehicle, which transfers stored diagnostics data to the system of the invention via a secure communications link 14. The manually captured diagnostic data from a reader can be correlating against past failure data captured by the technician during a repair event to generate a prediction on the probability of the next failure. This is also an application of Condition Based Maintenance.

Data may also be obtained through a technician console 12, where a vehicle technician performs repair work to identify the root cause of the component failure and manually enters the data directly into the system of the invention through a secure web portal. The failure data captured by the technician, optionally along with sublet repair vendor data, can be correlated against the vehicle or component age (expressed as mileage or time) to predict the probability of the next failure. This is an application of Age Based Maintenance.

The data warehouse 10 may comprise a database, such as an Oracle™ or SQL™ database. According to the invention, the database is modified so that as data is stored it is processed by embedded stochastic predictive modeling algorithms which access the data within the database, compare the data to historical comparators, and return a prediction model to the data provider (the user), in real time. Data is stored logically in silos within the data warehouse 10, which allows the full spectrum of data to be processed while keeping each vehicle fleet's data separate and secure.

The system of the invention thus combines a CMMS with stochastic predictive modeling algorithms that are run and applied to received data in real-time. This eliminates the need to batch-transfer data from a CMMS to a separate stochastic modeling software platform, which can result in modeled data (and thus fault and failure predictions) being out-dated or "stale". In accordance with the system of the invention, the vehicle repair data set used in stochastic predictive modeling will always be a true representation of the actual vehicle repair data set, resulting in modeled vehicle repair data that is always current or "fresh".

By combining vehicle repair data, stochastic predictive modeling and telematics sensor data, the system of the invention is able to provide fleet managers with the most up-to-date information available about their vehicles and the state of their fleet. This allows fleet managers to minimize the costs and environmental impact associated with unexpected faults and failures.

The system of the invention can be implemented as a logical multi-tenant solution, which means that multiple fleets can operate on the same system using the same database, which nevertheless keeps a logical separation of each fleet's data. By embedding stochastic modeling directly within the logical multi-tenant database, the system of the invention can model data and apply machine learning techniques to determine whether maintenance optimization changes are necessary at the point of data capture. Since the system of the invention is capable of capturing real-time telematics sensor data and other data, from multiple sources, and processes the data via embedded stochastic modeling algorithms, the system of the invention can also provide condition-based maintenance cost optimization.

By combining all fleet data into one database, the system of the invention is able to combine data sets across multiple fleets for the purpose of generating predictive failure models for all components and vehicle systems. Through the use of standardized coding and data capture methodology, the system of the invention can produce peer-sourced optimization modeling. In the preferred embodiment the system gives end users the ability to override data sets without affecting the integrity of the original CMMS data set.

Due to business accounting and reporting requirements, CMMS data is periodically locked from editing and is thus not modifiable by users of the system. This presents a limitation in terms of data cleansing, which is not always required but can be advantageously performed in cases where the data includes outliers or failure data resulting from a specific event (such as an accident) rather than from normal wear and tear. Embedding the modeling algorithms directly in the data warehouse 10 allows the system of the present invention to provide an additional data cleansing layer or separation layer of data on top of the locked data, also maintained within the data warehouse 10, specifically for the purpose of normalizing the data where necessary to provide maintenance optimization modeling.

In this fashion, the CMMS data used to create the predictive models can be adjusted (e.g. statistically filtered) without violating corporate data lock policies because the original locked data set remains intact and unadulterated. In the preferred embodiment, raw data from the separation layer is used to present an initial prediction model to the user, but the user can adjust the model iteratively by massaging the raw data to eliminate outliers and fault or failure data generated by abnormal events such as unexpected physical trauma to a component. The modeling software is then re-run on the cleansed separation layer, in real time, and generates an adjusted prediction model that is more accurate due to the data cleansing. It will be appreciated that the data cleansing step is optional and will not be required in all cases, however it is available in the system of the invention because the modeling algorithms are embedded in the data warehouse 10 and thus capable of real time model generation. This is not a practical feature in conventional systems, because by the time the data that was extracted to create the prediction model is cleansed, the raw data set has already changed so any adjustments to the data are being made to an obsolete data set.

In a preferred embodiment the administrator may offer to users as an option cross-fleet peer comparatives. Because different fleets operate their CMMS independently and have access only to their own data, a user can benefit from data supplied by other users to the extent that the predictive modeling algorithms derive optimization models based on a larger data set, which increases the reliability of the fault and failure predictions. Allowing a user the ability to participate in a program that utilizes anonymized data from multiple users as part of a crowd-sourced data also allows a user to determine how their equipment is performing compared to that of other users.

Figure 3:
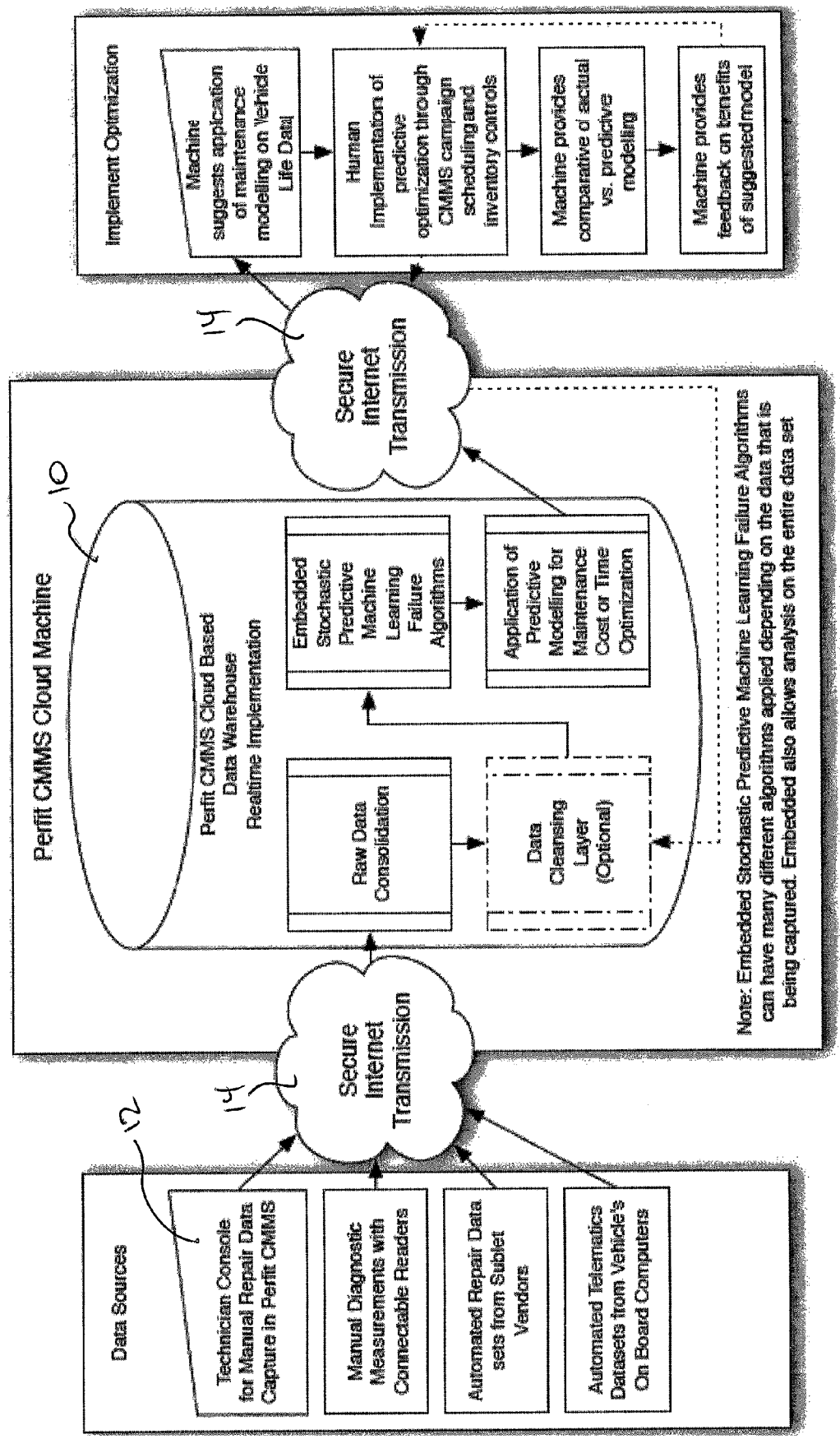
FIG. 3 is a schematic diagram of a computerized maintenance management system according to the invention.

As illustrated in FIG. 3, in the preferred embodiment the CMMS system is hosted by an administrator that provides cloud hosting and real-time processing of the fault and failure data received from multiple sources, and returns to each fleet maintenance manager a maintenance program derived from the predictive model.

At least one embodiment of the present invention having been described in detail by way of example, it will be apparent to those skilled in the art that variations and modifications may be made without departing from the invention. The invention includes all such variations and modifications as fall within the scope of the claims.

The invention claimed is:

1. A computerized maintenance management system for vehicles, comprising:
   a data warehouse, comprising:
      a communications link for continually receiving captured component failure data, component repair data, and captured vehicle operations data; and
      a storage component comprising a non-transitory computer-readable medium configured to store at least a portion of the captured component failure data and embodying computer-readable program code for:
         as data is being stored, generating an updated predictive model in real time based upon newly-captured component failure data; and
         generating recommended maintenance and/or component replacement schedules for individual vehicles based on the updated predictive model and the newly-captured vehicle repair and operations data.

2. The computerized maintenance management system of claim 1, wherein the non-transitory computer-readable medium is further configured to store at least a portion of the captured vehicle repair and operations data.

3. The computerized maintenance management system of claim 2, wherein the captured component failure data and captured vehicle repair and operations data from multiple fleets of vehicles are received and stored in respective logical silos.

4. The computerized maintenance management system of claim 1, wherein the computer-readable medium embodies computer-readable program code for providing a data cleansing layer based on the stored data, wherein the predictive model is based on data stored in the data cleansing layer.

5. The computerized maintenance management system of claim 4, wherein the computer-readable medium embodies computer-readable program code for enabling a user to modify the predictive model by modifying the data stored in the data cleansing layer.

6. A computer-implemented method for managing maintenance for vehicles, comprising the steps of:
   using the computer, continually receiving captured component failure data, component repair data and captured vehicle operations data via a communications link,
   using the computer, storing at least a portion of the captured component failure data in a non-transitory computer-readable medium of a data warehouse,
   as data is being stored, generating an updated predictive model in real time based upon newly-captured component failure data; and
   generating recommended maintenance and/or component replacement schedules for individual vehicles based on the updated predictive model and the newly-captured vehicle repair and operations data.

7. The computer-implemented method of claim 6, further comprising storing at least a portion of the captured vehicle operations data in the non-transitory computer-readable medium of the data warehouse.

8. The computer-implemented method of claim 7, wherein the captured component failure data and captured vehicle repair and operations data from multiple fleets of vehicles are received and stored in respective logical silos.

9. The computer-implemented method of claim 6, further comprising:
   using the computer, providing a data cleansing layer based on the stored data, wherein the predictive model is based on data stored in the data cleansing layer.

10. The computer-implemented method of claim 9, further comprising:
    using the computer, enabling a user to modify the predictive model by modifying the data stored in the data cleansing layer.

* * * * *